United States Patent
Chavanne et al.

(10) Patent No.: US 7,055,039 B2
(45) Date of Patent: May 30, 2006

(54) PROTECTION OF DIGITAL CONTENT USING BLOCK CIPHER CRYTOGRAPHY

(75) Inventors: Pierre Chavanne, Davis, CA (US); John Hwa, Fremont, CA (US); Lakshmana Pamarthy, Santa Clara, CA (US); Carl Quinn, San Jose, CA (US); Ralph Hill, Los Gatos, CA (US); Eric Swenson, Soquel, CA (US); Motomasa Futagami, Sunnyvale, CA (US); Atsushi Mituszawa, Kanagawa (JP)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 41 days.

(21) Appl. No.: 10/675,430

(22) Filed: Sep. 29, 2003

(65) Prior Publication Data

US 2004/0202322 A1    Oct. 14, 2004

Related U.S. Application Data

(60) Provisional application No. 60/462,987, filed on Apr. 14, 2003.

(51) Int. Cl.
*H04L 9/00* (2006.01)
*G06F 11/30* (2006.01)

(52) U.S. Cl. .......................... 713/193; 380/28; 380/37; 380/268

(58) Field of Classification Search ................ 713/193; 380/37, 28, 268; 708/203
See application file for complete search history.

(56) References Cited

U.S. PATENT DOCUMENTS

| | | | | |
|---|---|---|---|---|
| 5,195,136 | A * | 3/1993 | Hardy et al. | 380/43 |
| 5,677,952 | A * | 10/1997 | Blakley et al. | 713/189 |
| 6,185,684 | B1 * | 2/2001 | Pravetz et al. | 713/182 |
| 6,249,582 | B1 * | 6/2001 | Gilley | 380/28 |
| 6,618,789 | B1 * | 9/2003 | Okaue et al. | 711/103 |

OTHER PUBLICATIONS

Schneier, Bruce, "Applied Cryptography-Second Edition: protocols, algorithms, and source code in C", 1996, pp. 189-211, John Wiley & Sons, Inc., published in the US and Canada.

* cited by examiner

*Primary Examiner*—Kambiz Zand
(74) *Attorney, Agent, or Firm*—Blakely, Sokoloff, Taylor & Zafman LLP

(57) ABSTRACT

Protection of digital content using a specific application of block cipher cryptography is described. The digital content is encrypted using an encryption key and a calculated initialization vector. The digital content includes a plurality of strides of data and each stride includes a string of data to be encrypted and a block of data to be encrypted. The calculated initialization vector to be used to encrypt the block of data is derived from the string of data in the stride to be encrypted. Furthermore, the initialization vector is calculated by performing an exclusive disjunction function on a seed value and the string of data for each stride.

44 Claims, 12 Drawing Sheets

PROTECTION OF DIGITAL CONTENT USING BLOCK CIPHER CRYTOGRAPHY

RELATED APPLICATIONS

This application claims the benefit of U.S. Provisional Application No. 60/462,987, filed Apr. 14, 2003.

TECHNICAL FIELD

This invention relates generally to the protection of digital content using cryptology, and more particularly to the protection of digital content using cipher block chaining.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 2003, Sony Electronics, Inc., All Rights Reserved.

BACKGROUND

Digital Rights Management is a term used to describe the concept of protecting copyrighted material via encryption and governing its access via rules, typically distributed independently of the content. The protected content is usually inaccessible without a legitimately acquired license (embodying the rules governing the access) and software that securely interprets and releases the content if the appropriate license is available. This technology is promoted widely to music labels and other music/content distribution companies to use as a core technology for protecting their content.

Certain content encryption problems arise especially in the context of streamable media (e.g. media such as music or video that may be streamed across a network and rendered (e.g., played) while being streamed rather than after the entire content is received or when read from a local file). In these cases, encryption may need to be done in real time, and lossy transport protocols may cause situations where not all the content sent is ever received at the client. For example, lost blocks of encrypted data may cause the entire file to be unreadable. Furthermore, certain encryption techniques may increase the size of the digital content file.

SUMMARY OF THE INVENTION

Protection of digital content using a specific application of block cipher cryptography is described. The digital content is encrypted using an encryption key and a calculated initialization vector. The digital content includes a plurality of strides of data and each stride includes a string of data to be encrypted and a block of data to be encrypted. The calculated initialization vector to be used to encrypt the block of data is derived from the string of data in the stride to be encrypted. Furthermore, the initialization vector is calculated by performing an exclusive disjunction function on a seed value and the string of data for each stride.

DETAILED DESCRIPTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Figure 1:
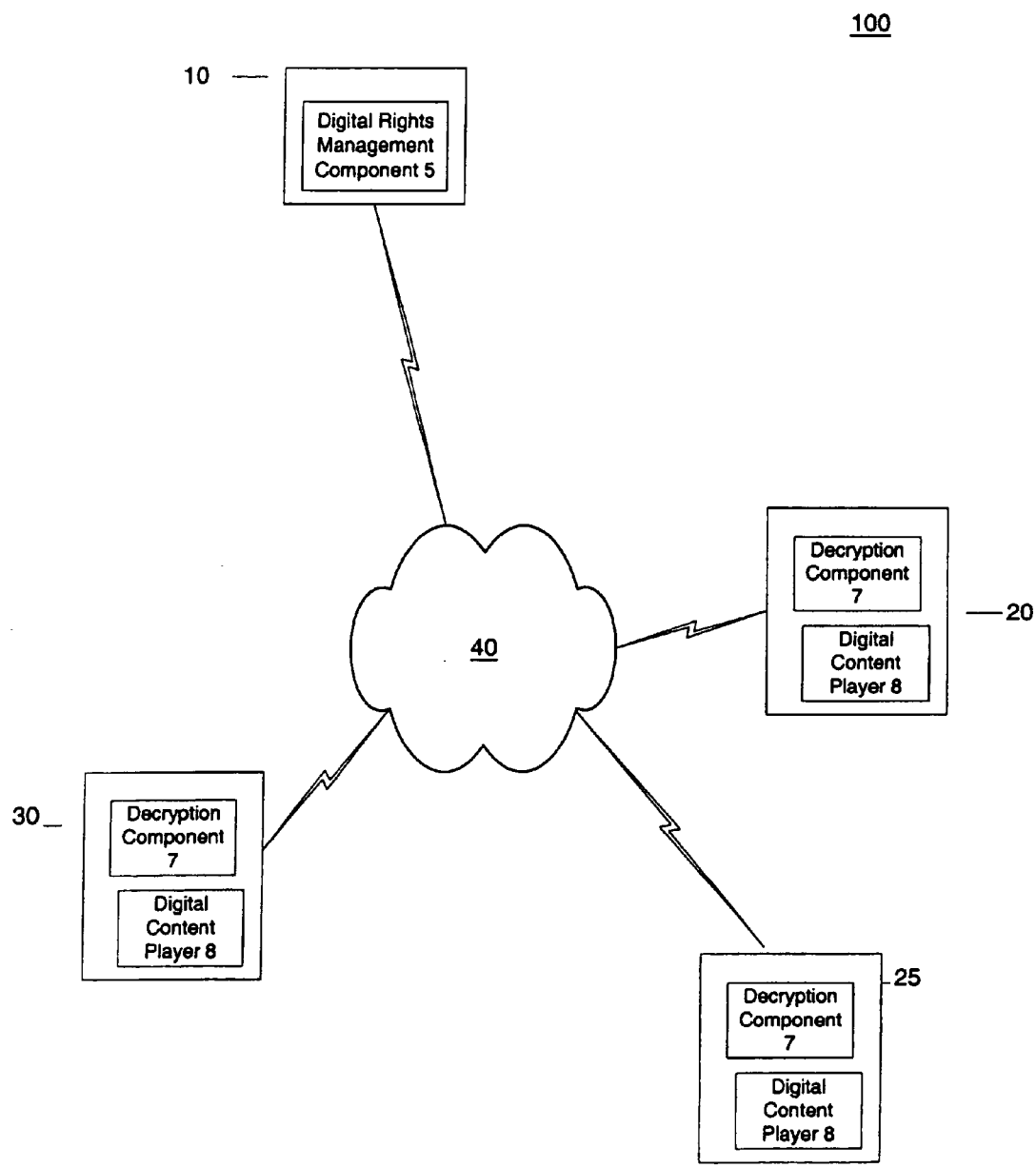
FIG. 1 is a diagram illustrating a system-level overview of an embodiment of the invention.

FIG. 1 illustrates one embodiment of a network environment 100. The network environment 100 includes a digital content provider server 10, client device 20, client device 25, and client device 30. The digital content provider server 10 is part of, or coupled to a network 40, such as the Internet, to exchange data with each of the client devices (20, 25, 30), as either a client or a server computer. It is readily apparent that the present invention is not limited to use with the Internet; alternatively directly coupled and private networks are also contemplated.

The digital content provider server 10 may store public domain or copyrighted digital content, such as digital music, electronic books, software source code, movies, etc. The digital content provider server 10 also includes a digital rights management component 5. The digital rights management component 5 includes encryption algorithms to encrypt the raw digital content for use by one or more authorized users of the digital content using the client devices (20, 25, 30).

Each client device (20, 25, 30) includes a decryption component 7 and a digital content player component 8. The decryption component 7 provides for the decryption of encrypted digital content (e.g., digital content encrypted by the digital rights management component 5). The digital content player component 8 provides for the rendering of the digital content. Each client device (20, 25, 30) may be, for example, a personal computer, a portable digital music player, a portable digital video player, among other well-known examples of devices used to render digital content.

Figure 2:
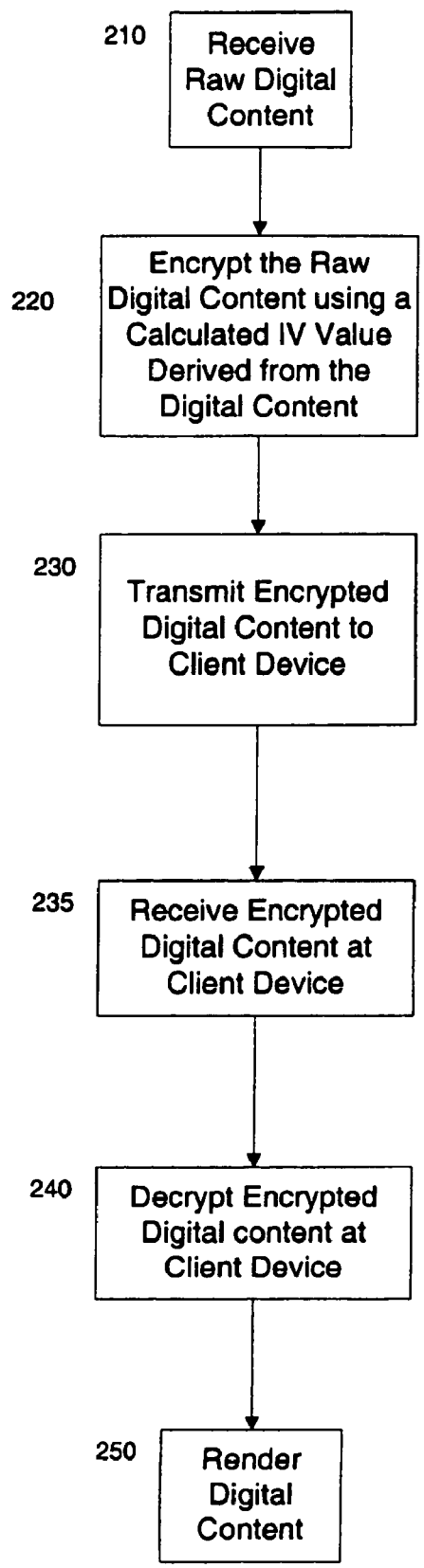
FIG. 2 illustrates one embodiment of a process flow for exchanging digital content within the network environment of FIG. 1.

FIG. 2 illustrates one embodiment of a process flow (200) for exchanging digital content within the network environment of FIG. 1.

At block 210, the digital rights management component 5 receives raw digital content. For example, the raw digital content may be a copyrighted digital music file or movie file.

At block 220, the digital rights management component 5 encrypts the raw digital content using block cipher cryptology and a calculated initialization vector value derived from the digital content, as described below and in conjunction with FIGS. 3A, 3B, 3C, 3D, 3E, and 4. In this way, the size of the digital content need not be increased, for example, by adding multiple initialization vectors when encrypted.

At block 230, the digital rights management component 5 transmits the encrypted digital content to a client device (e.g., the client device 20) over the network 40. The digital rights management component 5 also transmits the decryption key to decrypt the encrypted digital content. The decryption key may be the same as the encryption key value. The digital rights management component 5 may transmit the decryption key as part of the encrypted digital content or separately from the encrypted digital content. The digital rights management component 5 may also transmit a seed value as part of the encrypted digital content (e.g., a parameter value) or separately from the encrypted digital content.

At block 235, the client device 20 receives the encrypted digital content.

At block 240, the decryption component 7 of client device 20 decrypts the digital content using at least the decryption key and a calculated initialization vector derived from the digital content, as will be further described below and in conjunction with FIG. 6.

At block 250, the digital content player component 8 on the client device 20 facilitates the rendering of the decrypted digital content. For example, the digital content player component 8 may be a music player software application to render the decrypted music file.

The following will define various parameters of an encryption and decryption algorithm process, and illustrate various examples of applying the algorithm process to streaming media using parameter values. Specifically, the following describes encryption and decryption of logical units (e.g., access units) of the digital content based on block cipher cryptology using a calculated IV value, as will be described. A block cipher is a method of encrypting plaintext (to produce ciphertext) in which a cryptographic key (e.g., an encryption key) and an algorithm are simultaneously applied to all bits in a block of data (for example, 64 contiguous bits) at once as a group rather than to one bit at a time. It should be understood that plaintext and ciphertext are terms of art that represent unencrypted and encrypted data respectively.

As will be shown, the digital content is subdivided into logical units (e.g., access units) and each of these logical units is encrypted independently using block cipher cryptography. In this way, if a specific portion of the encrypted digital content file is lost (e.g., while transmitting the digital content file), the decryption of the remaining portion of the digital content file can be restarted at the next logical section.

Figure 3A:
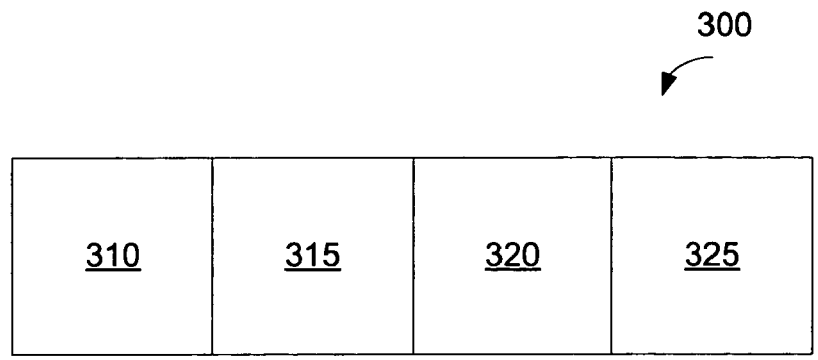
FIG. 3A illustrates one embodiment of a digital content having multiple access units.

FIG. 3A illustrates one embodiment of a digital content 300 having multiple access units. Specifically, the digital content 300 includes access unit 310, access unit 315, access unit 320, and access unit 325. The access units are chosen so that their content is a logical subdivision of the digital content, definable and addressable without knowledge of the data content itself. The access units are also small enough so that losing part of the digital content during transmission, for example, will not drastically affect rendering. The access unit may be an intrinsic property of the digital content (e.g., mpeg4 defined access unit) or defined as a parameter to the decryption component 7. Each access unit includes multiple strides.

Figure 3B:
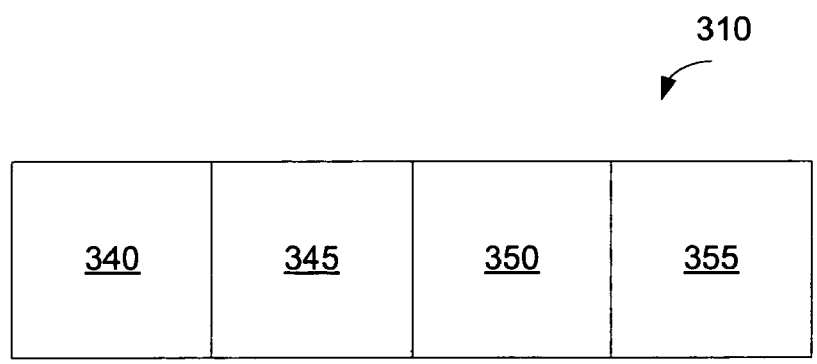
FIG. 3B illustrates one embodiment of the access unit of digital content having multiple strides.

FIG. 3B illustrates one embodiment of the access unit 310 of digital content 300 having multiple strides. A stride is a predefined length of data within an access unit. Specifically, access unit 310 includes stride 340, stride 345, stride 350, and stride 355. Within each stride (340, 345, 350, 355) there exists a block of data to be encrypted. The following describes a portion of the strides being encrypted with one or more block cipher modes of operation. For example, one mode is the electronic codebook (ECB) mode, in which a string of data to be encrypted is split into blocks (e.g., 16 byte blocks) and each block is encrypted separately.

Another example of a mode of block cipher is cipher-block chaining (CBC), in which each block of plaintext is split into blocks (e.g., 16 byte blocks) and is XORed with a previous ciphertext block before being encrypted. In order to prevent repeated encryption of same plaintext to result in identical ciphertext, CBC typically uses a different initialization vector (IV) to start each encryption sequence (e.g., access unit).

Typically, the inclusion of the initialization vector alongside each encrypted block sequence (or logical unit) would cause the file size to increase because one or more initialization vectors are embedded into the encrypted digital content to be delivered to the decryption component 7. This may be problematic if the digital content includes an index to specific locations in the digital file (e.g., a location of a scene in a digital movie file, a location of a specific song track on a music CD (compact disk), etc.) because the inclusion of the initialization vector will cause a shift of the physical header locations, thereby possibly making the files unreadable (unless they are recalculated prior to transmitting the file.

In one embodiment, the digital rights management component 5 encrypts the raw digital content using an initialization vector algorithmically calculated from a chosen string of data chosen from each stride of data to be encrypted for each access unit, under the assumption that the chosen string of data will be different enough from access unit to access unit that the result is a different initialization vector for each access unit to be encrypted.

Figure 3C:
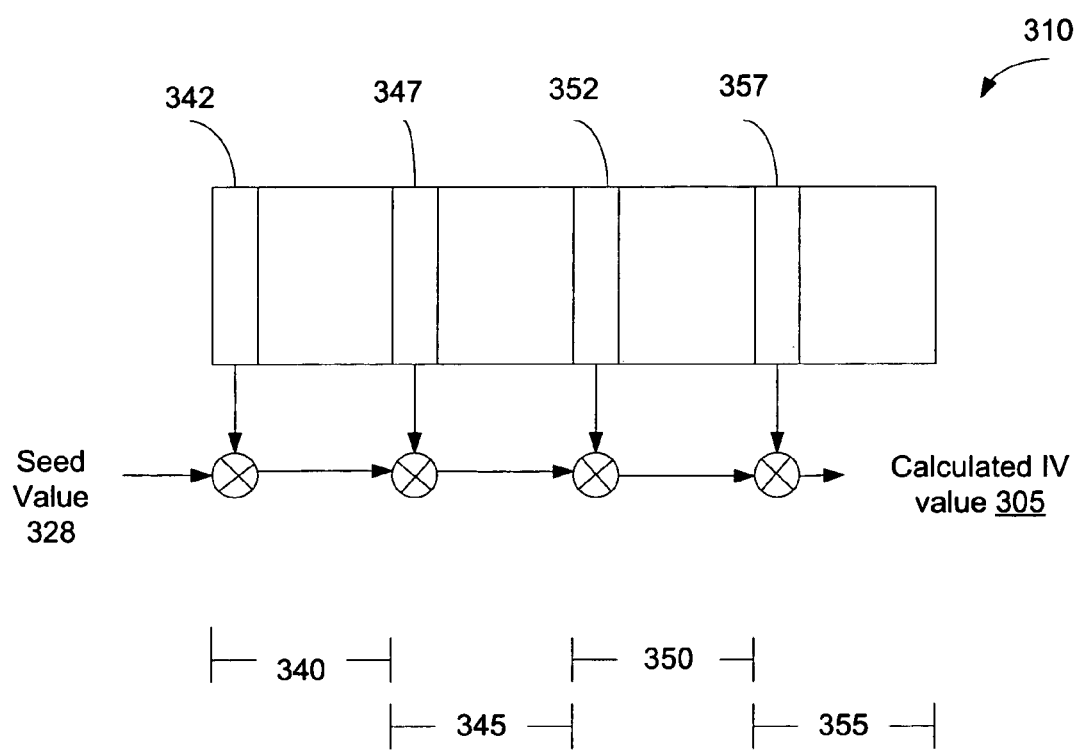
FIG. 3C illustrates one embodiment of a calculated IV value being derived from the access unit.
Figure 3D:
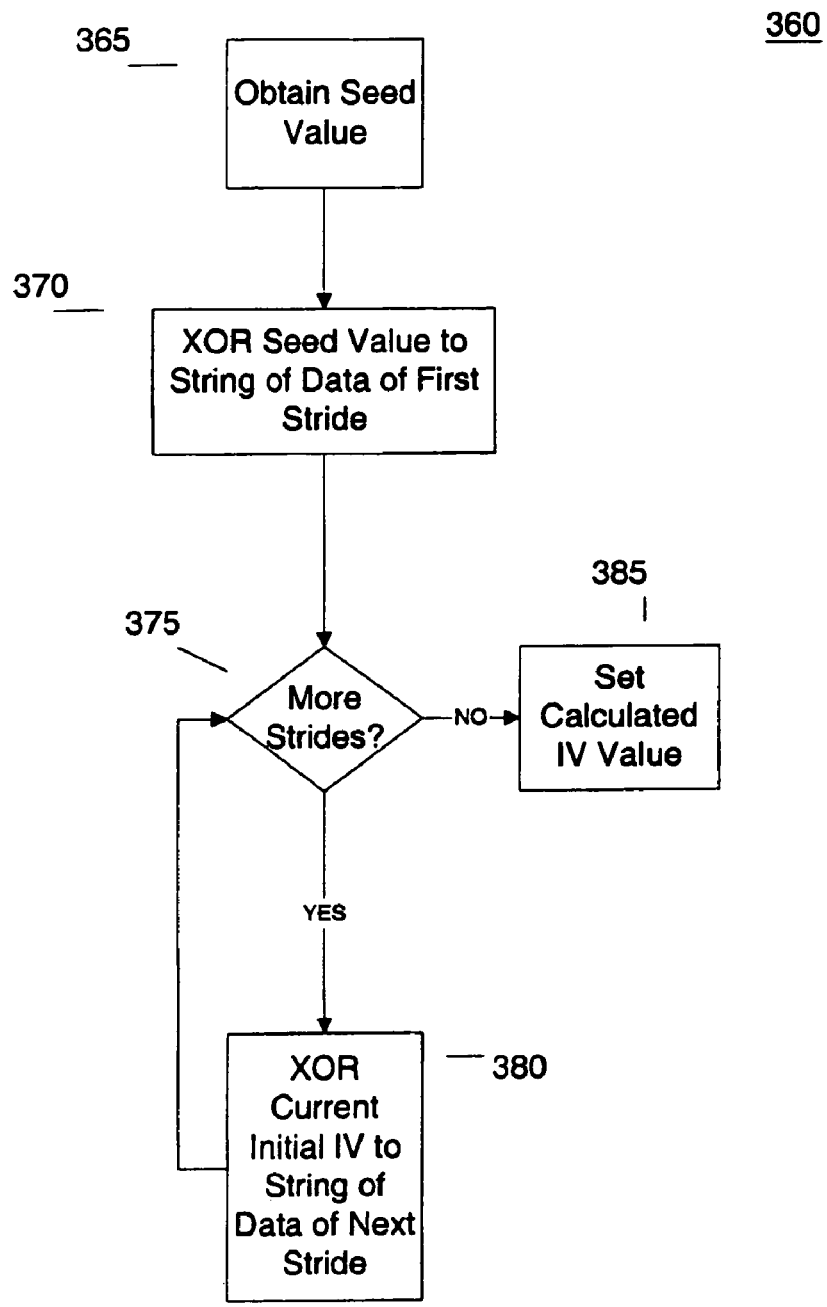
FIG. 3D illustrates one embodiment of a process flow for deriving the calculated IV value in conjunction with FIG. 3C.

FIG. 3C illustrates one embodiment of a calculated IV value being derived from the access unit 310. The first 16 bytes of each stride are illustrated as string of data 342, string of data 347, string of data 352, and string of data 357. FIG. 3D illustrates one embodiment of a process flow 360 for deriving the calculated IV value in conjunction with FIG. 3C.

At block 365, the digital rights management component 5 obtains a seed value 328. The seed value defines the initial value of the initialization vector.

At block 370, the digital rights management component 5 performs an exclusive disjunction function (e.g., XOR function) on the seed value 328 and the string of data 342 of the first stride 340 of the access unit 310 resulting in an initial IV value.

At block 375, the digital rights management component 5 determines whether there is another stride in the access unit 310. If there is another stride in the access unit 310, control passes to block 380. If there is not another stride in the access unit 310, control passes to block 385. Continuing the example, the digital rights management component 5 would determine the next stride to be stride 345.

At block 380, the digital rights management component 5 performs an XOR on the current initial IV value with the string of data 347 of the stride 345, resulting in an updated initial IV value. Control passes back to block 375 where the process repeats for string of data 352 and 357.

At block 385, the digital rights management component 5 sets a calculated IV value 305 to the current initial IV value. In one embodiment, the calculated IV value 305 is supplied to the underlying AES CBC cipher of the digital rights management component 5 to encrypt specific blocks of data within the access unit 310.

It should be understood that the invention is not limited to deriving the calculated IV value based on the first 16 bytes of each stride. Rather, in alternative embodiments, the calculated IV value may be derived from a set of implementation specific sections (e.g., 16 byte string of data) of an access unit, so that the decryption software knows where to find the specific sections. Preferably, the specific sections should have a high probability of resulting in sufficient randomness to generate a reasonably unique calculated IV value for each access unit.

It should also be noted that although the embodiments described herein use the seed value 328 when deriving the calculated IV value, the seed value 328 is not necessary, and the calculated IV value may be derived without using the seed value 328. For example, the calculated IV value may be calculated from XORing the first 16 bytes of each stride of an access unit without including the seed value 328.

Figure 3E:
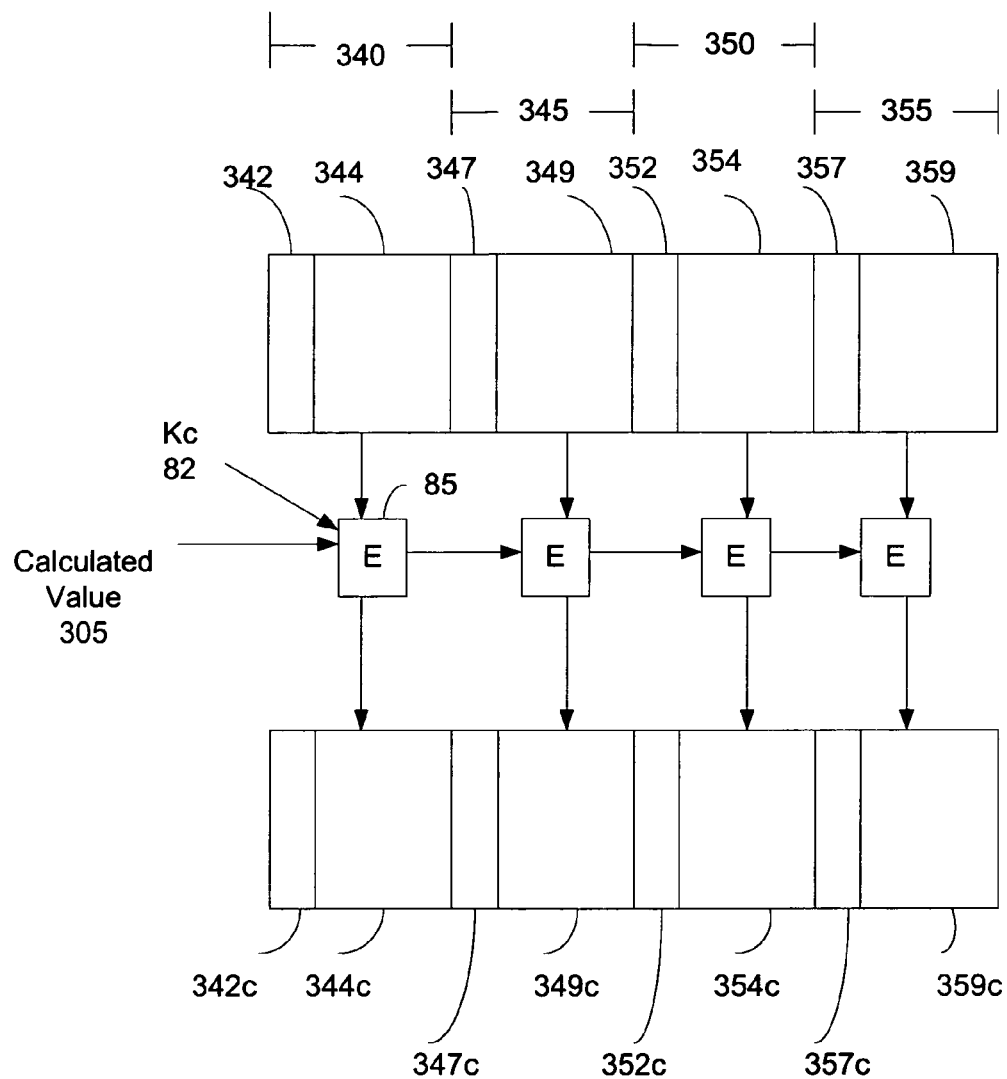
FIG. 3E illustrates one embodiment of a conceptual view for encrypting the access unit.
Figure 3F:
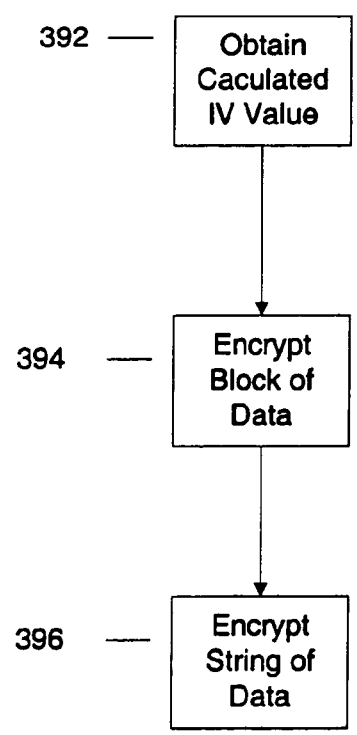
FIG. 3F illustrates one embodiment of a process flow for encrypting the access unit in FIG. 3E.

FIG. 3E illustrates one embodiment of a conceptual view for encrypting the access unit 310 using the calculated IV value 305 described above and in conjunction with FIGS. 3C and 3D. FIG. 3F illustrates one embodiment of a process flow 390 for encrypting the access unit 310 in FIG. 3C. The following shows the encryption process using an encryption key value ($K_C$) and a calculated IV value, as input parameters.

At block 392, the digital rights management component 5 obtains the calculated IV value 305, as described above.

At block 394, the digital rights management component 5 encrypts 85 the blocks of data 344, 349, 354, and 359 using the calculated IV value 305 and an encryption key 82 ($K_C$). In one embodiment, the encryption key value is a 16-byte (128-bit) value, randomly regenerated, that serves as the encryption key in the AES algorithm. The blocks of data 344, 349, 354, and 359 are encrypted using a cipher block chaining block cipher mode. Block of data 344c, 349c, 354c, and 359c represent the resulting encrypted blocks of data.

At block 396, the strings of data 342, 347, 352, and 357 are encrypted. The strings of data 342, 347, 352, and 357 are encrypted using an electronic code book block cipher mode. Strings of data 342c, 347c, 352c, and 357c represent the resulting encrypted strings of data.

Processes 360 and 390 may be repeated for each access unit of the digital content to be encrypted. It should be appreciated that in this way the digital content 300 will not increase in size nor cause header location shifts. That is, the encrypted digital content will remain the same size as the unencrypted digital content. This is because the encrypted digital content does not include an initialization vector from another source, such as from the data of a previously encrypted stride or a timestamp. Furthermore, the data required to reconstruct the IV is accessible from the cipher text block at decryption time, as will be described.

In one embodiment, the digital rights management component 5 includes an encryption algorithm based on the Advanced Encryption Standard, more commonly referred to as AES, which is a block cipher with a block size of 128 bits (e.g., 16 bytes) and key sizes of 128, 192, and 256 bits. However, the invention is not limited to using AES. Alternative algorithms well known to those of ordinary skill in the art may be used and are not described herein so as not to obscure the description.

In one embodiment, the digital rights management component 5 and the decryption component 7 use a number of parameter values in addition to the encryption key value, and the calculated IV value, to facilitate the encryption and decryption of the digital content. The parameter values may include, but are not limited to, an access unit size value, an encryption stride size value, a complete encryption value, an encryption chunk offset value, an encryption chunk size value, and an IV stride count value.

The access unit size value defines the size of the access unit being processed by the digital rights management component 5. In one embodiment, each access unit may be of different sizes and its boundaries are identifiable, which is well known to those of ordinary skill in the art.

The encryption stride size value defines the length of a stride. In one embodiment, a typical value for the encryption stride size value is 512 bytes. An access unit need not be an even multiple of the encryption stride size value. The last stride in an access unit may, therefore, be shorter than the encryption stride size value.

The complete encryption value is a flag used to identify a percentage of encryption to be applied or the percentage of encryption that has been applied to a digital content file. The following description describes processing performed at 100% encryption and 25% encryption, for example. However, the invention is not limited to these encryption percentages. Alternatively, the digital rights management software may encrypt the digital content at other percentages.

The encryption chunk offset value defines an offset from the beginning of a stride to a block of data to be encrypted, as will be further described.

The IV stride count value defines the number of strides that contribute to a calculated IV value. In one embodiment, the IV value used in the AES CBC processing (e.g., the calculated IV value) is calculated from the contents of the access unit to be encrypted. If the size of the access unit is less than the (IV stride count value * the encryption stride size value), the IV stride count value is adjusted by the digital rights management component 5 such that only as many strides as there are full strides in the access unit contribute to the calculated IV value. If the last stride is partial (e.g., if the last stride is less than the encryption stride size value), the IV stride count value is such that this partial stride should contribute to the calculated IV value. Furthermore, the partial stride does contribute if it is at least 16 bytes in length. Otherwise, that stride is ignored as far as the calculated IV value contribution is concerned. In our example we also limit the number of blocks contributing to the calculated IV value to four.

The encryption chunk size value defines a size of the block of data to be encrypted. In one embodiment, the encryption chunk size should be less than or equal to (the encryption stride size value minus the encryption chunk offset value). Since the AES implementation requires block sizes greater than or equal to 16 bytes (equal to key size . . . ), the encryption chunk size value is greater than or equal to 16 bytes. Also, the encryption chunk size value should be a multiple of the AES block size (16 bytes). For example, in one embodiment, there are two values of the encryption chunk size: 496 bytes and 128 bytes. For 100% encryption, the value of the complete encryption parameter is set to "true", and the entire stride (512 bytes) is encrypted where 496 bytes are encrypted using AES CBC and the 16 bytes of content contributing to the calculated IV value are encrypted with AES ECB.

Figure 4:
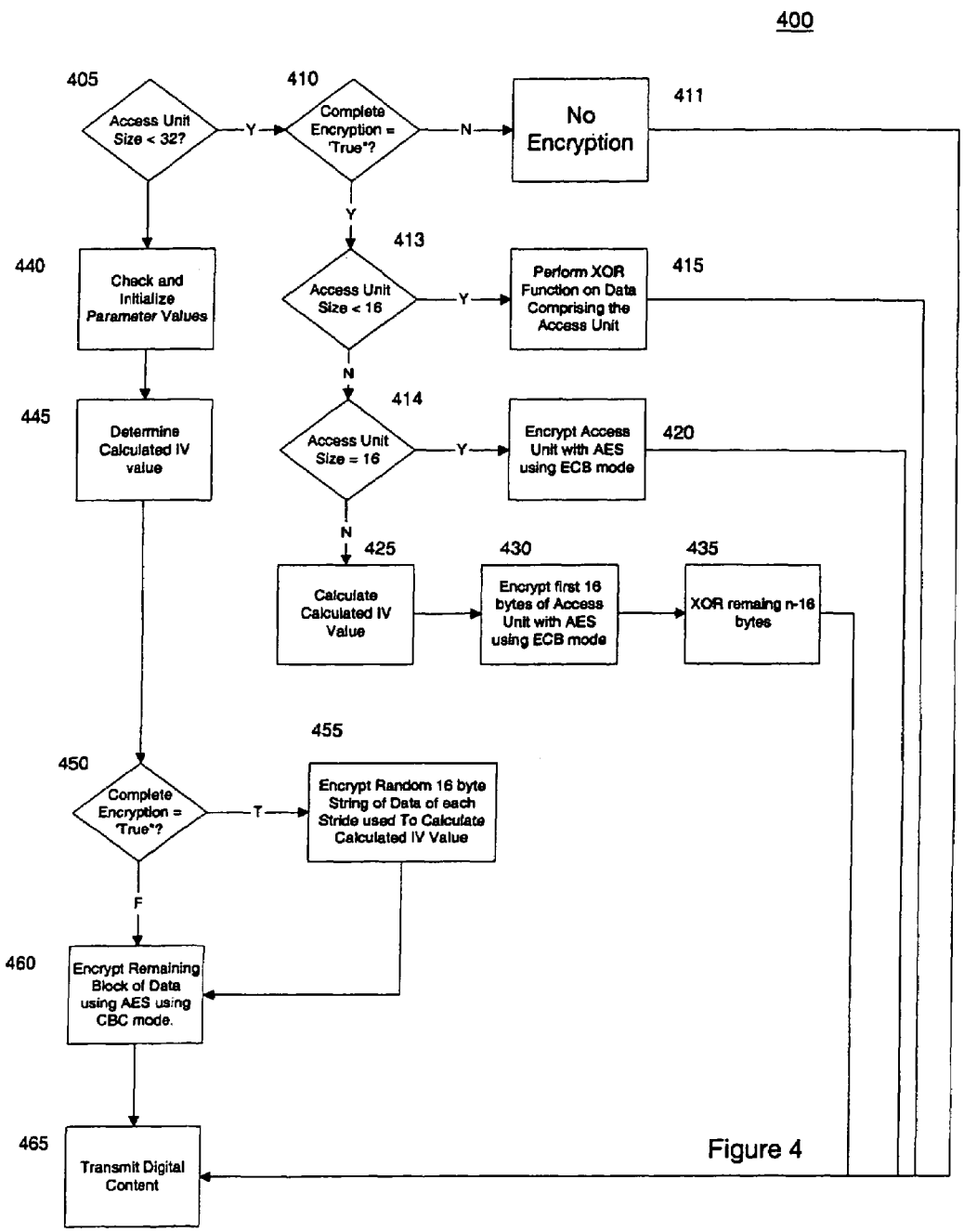
FIG. 4 illustrates one embodiment of a process flow of the digital rights management software to encrypt the copyrighted raw digital content.

FIG. 4 illustrates one embodiment of a process flow 400 of the digital rights management component 5 to encrypt the copyrighted raw digital content based on the parameter values.

At block 405, the digital rights management component 5 determines the access unit size value of an access unit to be encrypted. If the access unit size value is less than 32 bytes, control passes to block 410. If the access unit size value is greater than or equal to 32 bytes, control passes to block 440.

At block 410, the digital rights management component 5 determines the complete encryption value. If the complete encryption value is set to "false," control passes to block 411. If the complete encryption value is set to "true," control passes to block 413.

At block 411, the access unit is not encrypted but remains plaintext and control passes to block 465. The access unit may not be encrypted here because the access unit size is less than 32 bytes and other portions of the digital content may have been encrypted enough to make encrypting this access unit unnecessary.

At block 413, the digital rights management component 5 determines if the access unit size value is greater than zero bytes and less than 16 bytes, control passes to block 415. At block 414, if the access unit size value is 16 bytes, control passes to block 420. If the access unit size value is greater than 16 bytes and less than 32 bytes, control passes to block 425.

At block 415, the digital rights management component 5 performs an XOR function on the data comprising the access unit (e.g., the n access unit bytes) with the n leftmost bytes of $E(K_C$, seed value), and control passes to block 465.

At block 420, the digital rights management component 5 encrypts the 16 access unit bytes with AES using ECB mode and control passes to block 465.

At block 425, the digital rights management component 5 calculates the calculated IV value by performing an XOR function on the seed value and the first 16 bytes of the access unit.

At block 430, the digital rights management component 5 encrypts the first 16 bytes of the access unit with AES using ECB mode.

At block 435, the digital rights management component 5 performs an XOR function on the remaining n–16 bytes, with the n leftmost bytes of $E(K_C$, calculated IV value) and control passes to block 465.

At block 440, the digital rights management component 5 checks and initializes the parameters values previously described above. The digital rights management component 5 sets the IV stride count value to the number of strides in the access unit. The IV stride count value is calculated as being the access unit size value divided by the encryption stride size value.

Any fractional stride left over counts as a partial stride. However, it should be understood that if the last (possibly partial) stride is less than 16 bytes in length, and this stride would contribute to the calculated IV value due to the IV stride count's value being equal to the number of strides in the access unit, then the IV stride count value is decremented by one, so that less-than-16-byte fragments are not used.

The digital rights management component 5 sets the encryption chunk offset value. In one embodiment, the encryption chunk offset value is set to 16 bytes.

At block 445, the digital rights management component 5 determines a calculated IV value. In one embodiment, the calculated IV value is derived from the first 16 bytes of each of the first IV stride count values of the access unit as described above and in conjunction with FIGS. 3C and 3D.

At block 450, the digital rights management component 5 determines whether to encrypt the entire raw digital content. If the value of the complete encryption value is set to "true," control passes to block 455. If the complete encryption value is set to "false," control passes to block 460.

At block 455, the digital rights management component 5 encrypts the random 16 byte string of data of each stride used to calculate the calculated IV value. For example, the digital rights management component 5 encrypts the first 16 byte string of data of each stride using AES with the Electronic Code Book (ECB) mode. In one embodiment, no calculated IV value is involved in this calculation.

At block 460, the digital rights management component 5 encrypts the remaining block of data with AES using CBC mode. For example, the digital rights management component 5 encrypts the block of data starting at the encryption chunk offset from the start of the stride and encryption chunk size in length. Hence, the calculated IV value is used as the initial IV value for the AES cipher (as described in 3E and 3F for each access unit). In one embodiment, each applicable block of data in each stride are part of the same AES cipher block chain started for each access unit. In an alternative embodiment, AES is restarted with each stride.

At block 465, the digital rights management component 5 transmits the encrypted digital content to the client device.

It should be understood that the calculated IV value is not limited to being derived from the first 16 bytes of each stride of the access unit to be encrypted. Rather, in alternative embodiments, the calculated IV value may be derived from any random 16 byte (but well specified in location) string of data from each stride of the access unit to be encrypted.

It should be appreciated that special processing occurs for the remaining blocks that are not an exact multiple of the AES block size (16 bytes). For all strides except the last one, the blocks will be an integral multiple of the AES block size (e.g., 16 bytes). However, a short access unit may result in a partial stride (e.g., having a block size less than 16 bytes).

Figure 5:
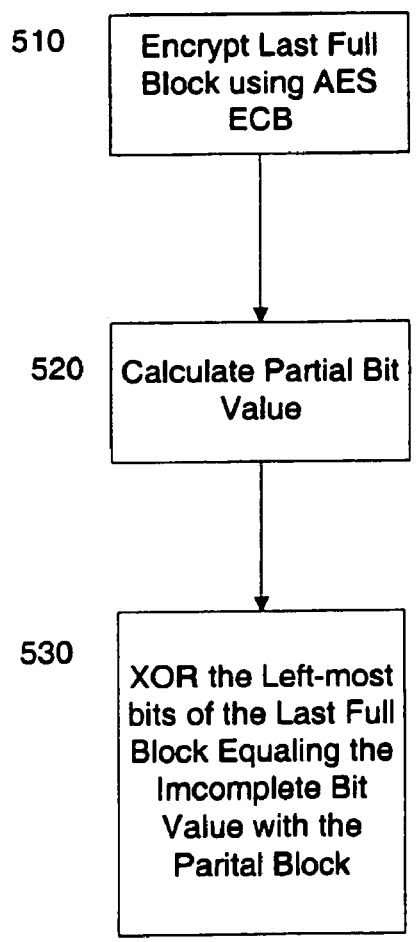
FIG. 5 illustrates one embodiment of a process flow for encrypting a partial stride.

FIG. 5 illustrates one embodiment of a process flow 500 for encrypting a partial stride.

At block 510, the digital rights management component 5 encrypts the cipher text of the last full block with AES ECB (e.g. not, for example, the block used to derive the calculated IV if that happens to be the previous full block) using AES ECB (all encryption is done using the same, original, input encryption key).

At block 520, the digital rights management component 5 calculates a partial bit value as the number of bits in the partial block.

At block 530, the digital rights management component 5 performs an XOR function on the left-most bits of the last full block equaling the partial bits value with the partial block of the stride to generate the corresponding cipher text.

It should be understood that process 400 and process 500 will be repeated for each access unit in the digital content.

Alternatively, the digital rights management component 5 may encrypt specific or partial strides of the digital content for quick encryption of digital content, for example.

Figure 6:
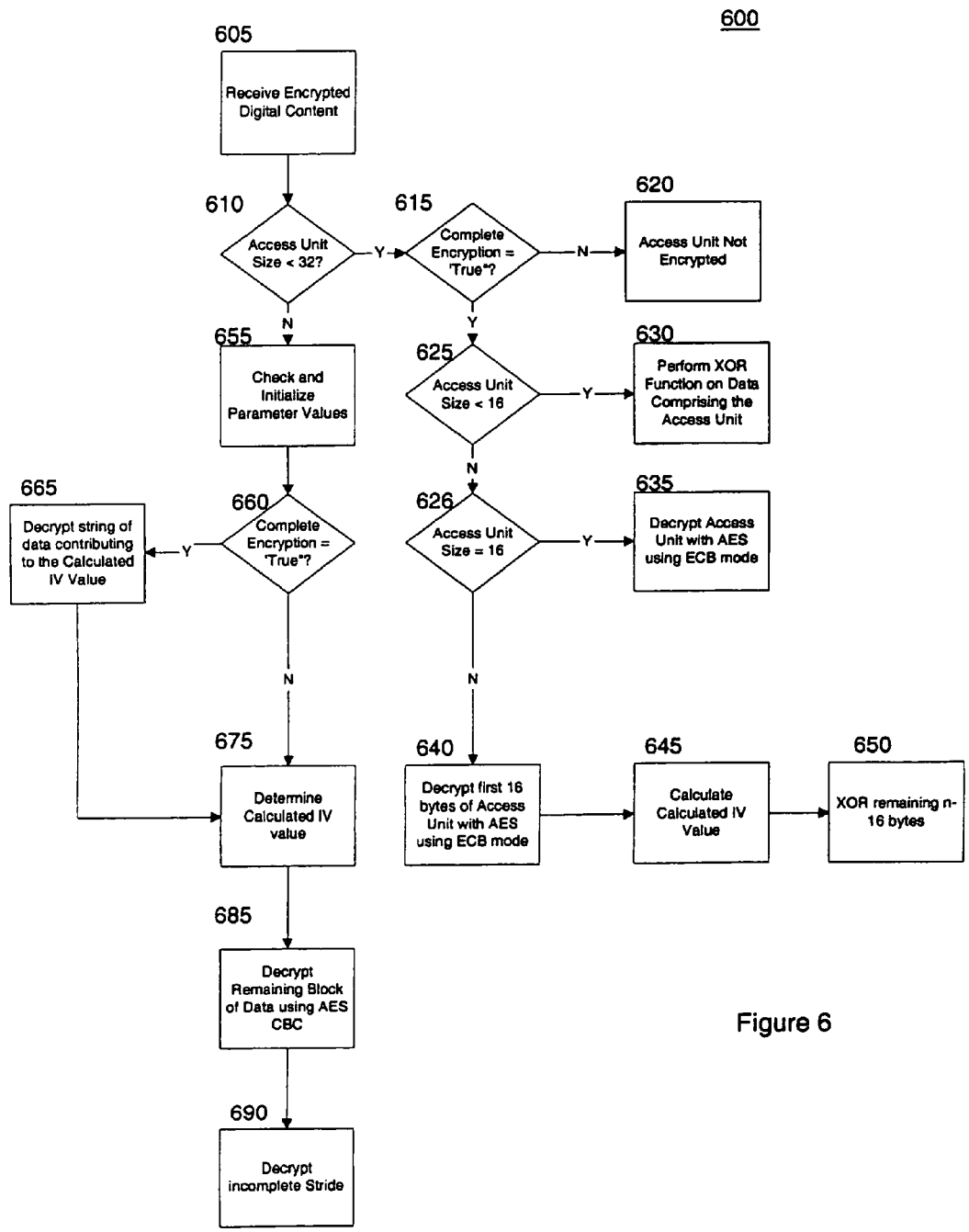
FIG. 6 illustrates one embodiment of a process flow of the client decryption software to decrypt the encrypted digital content on a client device.

FIG. 6 illustrates one embodiment of a process flow 600 of the decryption component 7 to decrypt the encrypted digital content on a client device.

At block 605, the client device receives encrypted digital content (and determines the decryption parameters—possibly from data in the content file, e.g. partial or full encryption, seed IV value, stride size, etc . . . ).

At block 610, the decryption component 7 determines the access unit size value of an access unit to be decrypted. If the access unit size value is less than 32 bytes, control passes to block 615. If the access unit size value is greater than 32 bytes, control passes to block 655.

At block 615, the decryption component 7 determines the complete encryption value. If the complete encryption value is set to "false," control passes to block 620. If the complete encryption value is set to "true," control passes to block 625.

At block 620, the decryption component 7 determines the access unit is not encrypted and process 600 ends.

At block 625, the decryption component 7 determines if the access unit size value is greater than zero bytes and less than 16 bytes, control passes to block 630. At block 626, if the access unit size value is 16 bytes, control passes to block 635. If the access unit size value is greater than 16 bytes and less than 32 bytes, control passes to block 640.

At block 630, the decryption component 7 performs an XOR function on the data comprising the access unit (e.g., the n access unit bytes) with the n leftmost bytes of $D(K_C,$ seed value), and the process 600 ends.

At block 635, the decryption component 7 decrypts the 16 access unit bytes with AES using ECB mode and the process 600 ends.

At block 640, the decryption component 7 decrypts the first 16 access unit bytes with AES using ECB mode.

At block 645, the decryption component 7 calculates the calculated IV value by performing an XOR function on the seed value and the remaining 16 bytes of the access unit.

At block 650, the digital rights management component 5 performs an XOR function on the remaining n−16 bytes with the n leftmost bytes of $D(K_C,$ IV calculated value).

At block 655, the digital rights management component 5 checks and initializes the parameter values. The digital rights management component 5 sets the IV stride count value to the number of strides in the access unit. The IV stride count value is calculated as being the value of access unit size value divided by the encryption stride size value.

At block 660, the decryption component 7 determines the complete encryption value of the received digital content. If the complete encryption value is "True," control passes to block 665. If the complete encryption value is "False," control passes to block 675.

At block 665, the decryption component 7 decrypts the block of data contributing to the calculated IV value. For example, the first 16 byte string of data of the stride (cipher text) for each of IV stride count values are decrypted. The decryption may intrinsically know the location of the blocks of data contributing to the calculated IV value or locations may be passed as parameters in an alternative embodiment. In one embodiment, no IV is involved in the decryption.

At block 675, the decryption component 7 determines the calculated IV value. In one embodiment, the calculated IV value is derived by performing an XOR function on a 16 byte string of data from each stride with a seed value, as described above. The seed value may have been transmitted separately from the digital content or appended to the digital content.

At block 685, the decryption component 7 decrypts the remaining encrypted block of data using AES CBC and the calculated IV value.

At block 690, the decryption component 7 decrypts the partial stride, if necessary. In one embodiment the partial stride is decrypted as described in FIG. 7.

It should be understood the process 600 may be repeated for each access unit in the digital content as needed.

Figure 7:
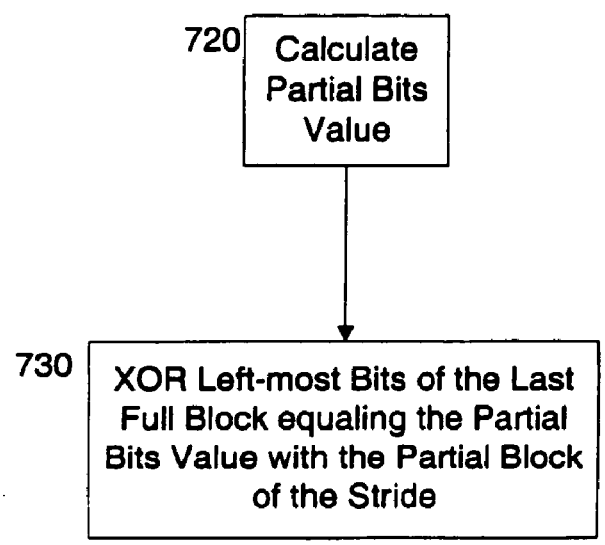
FIG. 7 illustrates one embodiment of a process flow for decrypting a partial stride.

FIG. 7 illustrates one embodiment of a process flow 700 for decrypting a partial block (as in less than key length).

At block 720, the digital rights management component 5 calculates a partial bits value as the number of bits in the partial block.

At block 730, the digital rights management component 5 performs an XOR function of the bits of the partial block with the n left-most bits of the last full block (n equaling the number of bits in the partial block), to generate the corresponding cipher text.

Figure 8:
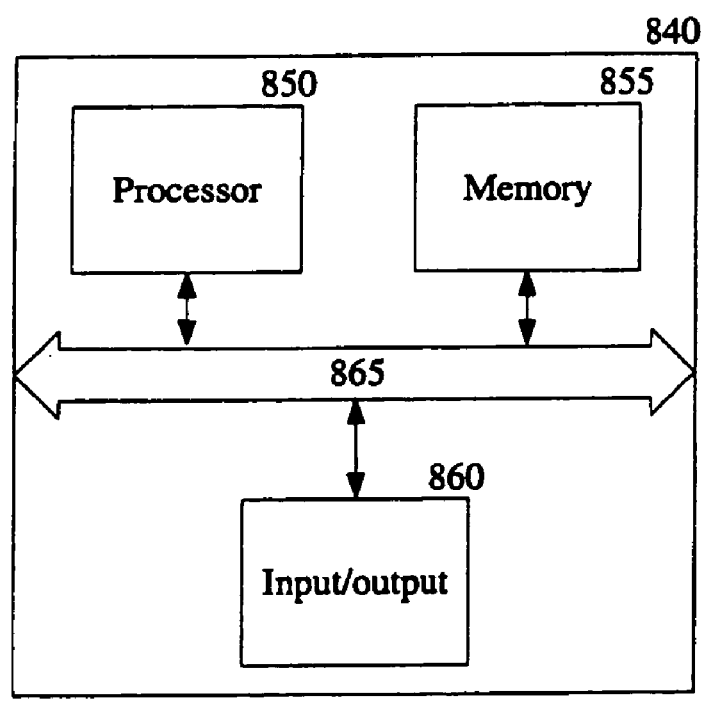
FIG. 8 illustrates one embodiment of a computer system suitable for implementation.

FIG. 8 illustrates one embodiment of a computer system suitable for performing the features of an embodiment of the invention. The computer system 840 includes a processor 850, a memory 855, and an input/output capability 860, all coupled to a system bus 865. Such a configuration encompasses personal computer systems, network computers, television based systems, such as Web TVs or set-top boxes, handheld devices, such as portable music players, digital video players, mobile phones and personal digital assistants, and similar devices.

The processor 850 represents a central processing unit of any type of architecture, such as a CISC, RISC, VLIW, DSP, or hybrid architecture. In addition, the processor 850 could be implemented on one or more chips. The memory 855 is configured to store instructions which, when executed by the processor 850, performs the methods described herein. The memory 855 may also store the user information and the contact information.

Input/output 860 may include components to facilitate user interaction with the computer system 840 such as a keyboard, a mouse, a display monitor, a microphone, a speaker, a display, a network card (e.g., Ethernet, Inferred, cable modem, Fax/Modem, etc.), etc. Input/output 860 also encompasses various types of machine-readable media, including any type of storage device that is accessible by the processor 850. For example, a machine-readable medium may include read only memory ("ROM"); random access memory ("RAM"); magnetic disk storage media; optical storage media; flash memory devices; electrical, optical, acoustical, or other forms of propagated signals (e.g., carrier waves, infrared signals, digital signals, etc.). Thus, a machine-readable medium includes any mechanism that provides (i.e., stores and/or transmits) information in a form readable by a machine (e.g., a computer). One of skill in the art will immediately recognize that the term "machine-readable medium/media" further encompasses a carrier wave that encodes a data signal.

It will also be appreciated that the operating system software executing the digital rights management component 5, the decryption component 7, and the digital content player 8 stored in memory 855 may control the computer system 840. The operating system may be, for example, PC-based, Mac-based, Unix-based, Palm OS, etc. Input/output and related media 860 store the machine-executable instructions for the operating system and methods of the present invention.

In addition, the bus 865 may represent one or more busses (e.g., PCI, ISA, X-Bus, EISA, VESA, etc.) and bridges (also termed as bus controllers). While this embodiment is described in relation to a single processor computer system, the invention could be implemented in a multi-processor computer system.

The description of FIG. 8 is intended to provide an overview of computer hardware and other operating components suitable for implementing the invention, but is not intended to limit the applicable environments. It will be appreciated that the computer system 840 is one example of many possible computer systems that have different architectures. A typical computer system will usually include at least a processor, a memory, and a bus coupling the memory to the processor. One of skill in the art will immediately appreciate that the invention can be practiced with other computer system configurations, including multiprocessor systems, minicomputers, mainframe computers, and the like. The invention can also be practiced in distributed computing environments where tasks are performed by remote processing devices that are linked through a communications network.

It will be appreciated that more or fewer processes may be incorporated into the methods illustrated in FIGS. 2, 3D, 3F, 4, 5, 6, and 7, without departing from the scope of the invention and that no particular order is implied by the arrangement of blocks shown and described herein. It will be further appreciated that the method described in conjunction with FIGS. 2, 3D, 3F, 4, 5, 6, and 7, may be embodied in machine-executable instructions, (e.g., software). The instructions can be used to cause a general-purpose or special-purpose processor that is programmed with the instructions to perform the operations described. Alternatively, the operations might be performed by specific hardware components that contain hardwired logic for performing the operations, or by any combination of programmed computer components and custom hardware components. The methods may be provided as a computer program product that may include a machine-readable medium having stored thereon instructions, which may be used to program a computer (or other electronic devices) to perform the methods. For the purposes of this specification, the term "machine-readable medium" shall be taken to include any medium that is capable of storing or encoding a sequence of instructions for execution by the machine and that causes the machine to perform any one of the methodologies of the present invention. The term "machine-readable medium" shall accordingly be taken to include, but not be limited to, solid-state memories, optical and magnetic disks, and carrier wave signals. Furthermore, it is common in the art to speak of software, in one form or another (e.g., program, procedure, process, application, module, logic, etc.), as taking an action or causing a result. Such expressions are merely a shorthand way of saying that execution of the software by a computer causes the processor of the computer to perform an action or to produce a result.

Protection of digital content using block cipher cryptography has been described. It should be appreciated that the encryption does not change the size of the encrypted data and therefore any additional headers necessary to decrypt do not need to be adjusted. Furthermore, it is possible to resume decrypting the streamed content even if some packets are lost during transmission. Encryption chains are and can be restarted at close enough intervals so as to not destroy the viewing experience when packet loss occurs. This is due to the capability to derive the calculated IV value at whichever point the decryption is restarted, and to the fact that the CBC is restarted at well defined intervals (e.g., access units) that are known without decrypting the content. Also, it should be appreciated that to improve the security of CBC, the calculated IV value is different each time it is used with the same key. Since one of the goals of the method is to not add data to the file, the calculated IV value is generated from reasonably random data collected from the sample to be encrypted itself.

Furthermore, a mechanism for partial media encryption has been disclosed that parameterizes the amount of encryption so that for less capable devices, less than 100% encryption can be used.

It should be understood that the digital rights management component 5 may perform additional checks and initializations than those disclosed above. For example, the digital rights management component 5 checks if the encryption chunk size value is less than or equal to (the encryption stride size value minus the encryption chunk offset value). Furthermore, the encryption chunk size value may be checked to ensure it is a multiple of the AES block size (16 bytes).

While the invention has been described in terms of several embodiments, those skilled in the art will recognize that the invention is not limited to the embodiments described. The method and apparatus of the invention can be practiced with modification and alteration within the scope of the appended claims. The description is thus to be regarded as illustrative instead of limiting on the invention.

What is claimed is:

1. A computerized method comprising:
   encrypting digital content using an encryption key and a calculated initialization vector (IV), wherein the digital content comprises a plurality of strides, each stride comprising a string of data to be encrypted and a block of data, and wherein the calculated IV comprises information from the strings of data in the strides.

2. The computerized method of claim 1, wherein the calculated IV is further derived from each string of data and a seed value using an exclusive disjunction (XOR) function.

3. The computerized method of claim 1, wherein the calculated IV is further derived from each string of data using an exclusive disjunction (XOR) function.

4. The computerized method of claim 1, wherein each string of data is encrypted using an advance encryption standard cipher with an electronic codebook mode.

5. The computerized method of claim 1, wherein each block of data is encrypted using an advance encryption standard cipher with a cipher block chaining mode.

6. The computerized method of claim 1, wherein each string of data comprises a pre-determined number of bytes of a stride of an access unit.

7. The computerized method of claim 1, wherein the digital content is a digital music file or a digital video file.

8. A computerized method comprising:
   calculating an initialization vector for encrypting data using a block cipher, wherein the data comprises a plurality of strides, each stride comprising a string of data and a block of data, and the initialization vector comprises information from the strings of data in the strides.

9. The computerized method of claim 8, wherein the calculating further comprises:
   performing an exclusive disjunction (XOR) function on each string of data.

10. The computerized method of claim 8, wherein the calculating further comprises:
    performing an exclusive disjunction (XOR) function on a seed value and each string of data.

11. The computerized method of claim 8, wherein the data is a digital content file.

12. A machine-readable medium having instructions to cause a machine to perform a method, the method comprising:
    encrypting digital content using an encryption key and a calculated initialization vector (IV), wherein the digital content comprises a plurality of strides, each stride comprising a string of data to be encrypted and a block of data, and the calculated IV comprises information from the strings of data in the strides.

13. The machine-readable medium of claim 12, wherein the calculated IV is further derived from each string of data and a seed value using an exclusive disjunction (XOR) function.

14. The machine-readable medium of claim 12, wherein the calculated IV is further derived from each string of data using an exclusive disjunction (XOR) function.

15. The machine-readable medium of claim 12, wherein each string of data is encrypted using an advance encryption standard cipher with an electronic codebook mode.

16. The machine-readable medium of claim 12, wherein each block of data is encrypted using an advance encryption standard cipher with a cipher block chaining mode.

17. The machine-readable medium of claim 12, wherein each string of data comprises a pre-determined number of bytes of a stride of an access unit.

18. The machine-readable medium of claim 12, wherein the digital content is a digital music file or a digital video file.

19. A machine-readable medium having instructions to cause a machine to perform a method, the method comprising:
calculating an initialization vector for encrypting data using a block cipher, wherein the data comprises a plurality of strides, each stride comprising a string of data and a block of data, and the initialization vector comprises information from the strings of data in the strides.

20. The machine-readable medium of claim 19, wherein the calculating further comprises:
performing an exclusive disjunction (XOR) function on each string of data.

21. The machine-readable medium of claim 19, wherein the calculating further comprises:
performing an exclusive disjunction (XOR) function on a seed value and each string of data.

22. The machine-readable medium of claim 19, wherein the data is a digital content file.

23. A system comprising:
a processor coupled to a memory through a bus; and
an encryption process executed by the processor from the memory to cause the processor to encrypt digital content using an encryption key and a calculated initialization vector (IV), wherein the digital content comprises a plurality of strides, each stride comprising a string of data to be encrypted and a block of data, and wherein the calculated IV comprises information from the strings of data in the strides.

24. The system of claim 23, wherein the calculated IV is derived from each string of data using an exclusive disjunction (XOR) function.

25. The system of claim 23, wherein the calculated IV is derived from each string of data and a seed value using an exclusive disjunction (XOR) function.

26. The system of claim 23, wherein each string of data is encrypted using an advance encryption standard cipher with an electronic codebook mode.

27. The system of claim 23, wherein each block of data is encrypted using an advance encryption standard with a cipher block chaining mode.

28. The system of claim 23, wherein each string of data comprises a first pre-determined number of bytes of a stride of an access unit.

29. The system of claim 23, wherein the digital content is a digital music file or a digital video file.

30. A system comprising:
a processor coupled to a memory through a bus; and
an encryption process executed by the processor from the memory to cause the processor to calculate an initialization vector for encrypting data using a block cipher, wherein the data comprises a plurality of strides, each stride comprising a string of data and a block of data, and the initialization vector comprises information from the strings of data in the strides.

31. The system of claim 30, wherein the encryption process further causes the processor, when calculating the initialization vector, to perform an exclusive disjunction (XOR) function on each string of data.

32. The system of claim 30, wherein the encryption process further causes the processor, when the calculating the initialization vector, to perform an exclusive disjunction (XOR) function on a seed value and each string of data.

33. The system of claim 30, wherein the data is a digital content file.

34. An apparatus comprising:
means for receiving digital content; and
means for encrypting the digital content using an encryption key and a calculated initialization vector (IV), wherein the digital content comprises a plurality of strides, each stride comprising a string of data to be encrypted and a block of data, and wherein the calculated IV comprises information from the strings of data in the strides.

35. The apparatus of claim 34, wherein the calculated IV is derived from each string of data using an exclusive disjunction (XOR) function.

36. The apparatus of claim 34, wherein the calculated IV is derived from each string of data and a seed value using an exclusive disjunction (XOR) function.

37. The apparatus of claim 34, wherein each string of data is encrypted using an advance encryption standard cipher with an electronic codebook mode.

38. The apparatus of claim 34, wherein each block of data is encrypted using an advance encryption standard with a cipher block chaining mode.

39. The apparatus of claim 34, wherein each string of data comprises a first pre-determined number of bytes of a stride of an access unit.

40. The apparatus of claim 34, wherein the digital content is a digital music file or a digital video file.

41. A apparatus comprising:
means for receiving data; and
means for calculating an initialization vector for encrypting the data using a block cipher, wherein the data comprises a plurality of strides, each stride comprising a string of data and a block of data, and the initialization vector comprises information from the strings of data in the strides.

42. The apparatus of claim 41, wherein the means for calculating further comprises:
a means for performing an exclusive disjunction (XOR) function on each string of data.

43. The apparatus of claim 41, wherein the means for calculating further comprises:
a means for performing an exclusive disjunction (XOR) function on a seed value and each string of data.

44. The apparatus of claim 41, wherein the data is a digital content file.

* * * * *